United States Patent [19]

Coe et al.

[11] Patent Number: 5,177,117

[45] Date of Patent: Jan. 5, 1993

[54] CONTROLLED RELEASE CATALYSTS AND CURING AGENTS FOR MAKING POLYURETHANE AND/OR POLYISOCYANURATE PRODUCT

[75] Inventors: Charles G. Coe, Macungie; Robert G. Petrella, Allentown, both of Pa.

[73] Assignee: Air Products and Chemicals, Inc., Allentown, Pa.

[21] Appl. No.: 498,254

[22] Filed: Mar. 23, 1990

Related U.S. Application Data

[63] Continuation-in-part of Ser. No. 345,399, May 1, 1989, abandoned.

[51] Int. Cl.⁵ .................... C08G 18/18; C08J 9/08
[52] U.S. Cl. .................... 521/117; 521/122; 521/123; 521/128; 521/129; 521/170; 521/902
[58] Field of Search .............. 521/117, 122, 123, 128, 521/129, 170, 902

[56] References Cited

U.S. PATENT DOCUMENTS

| | | | |
|---|---|---|---|
| 3,036,980 | 5/1962 | Dunham et al. | 523/211 |
| 3,227,666 | 1/1966 | Showalter | 521/122 |
| 3,235,620 | 2/1966 | Charleston et al. | 525/524 |
| 3,384,680 | 5/1968 | Lusson | 528/92 |
| 3,417,046 | 12/1968 | Giambra et al. | 523/211 |
| 3,499,864 | 3/1970 | Millen et al. | 524/760 |
| 3,528,933 | 9/1970 | Johnson | 528/107 |
| 4,518,718 | 5/1985 | Frost | 521/122 |
| 4,707,501 | 11/1987 | Petrella | 521/115 |
| 4,882,363 | 11/1989 | Neuhaus et al. | 521/122 |

FOREIGN PATENT DOCUMENTS

| | | |
|---|---|---|
| 0319866 | 6/1989 | European Pat. Off. |
| 0388952 | 9/1990 | European Pat. Off. |
| 1173240 | 6/1961 | Fed. Rep. of Germany |

OTHER PUBLICATIONS

"Chemical Loaded Molecular Sieves"; Union Carbide Bulletin; Jul. 1959.

Linde Bulletin F-1349; "Chemical Loaded Molecular Sieves in Rubber and Plastics"; Union Carbide Corporation; Dec., 1959.

CA Selects: Polyurethanes, Issue 6, 1988 108:76395b.

*Primary Examiner*—John Kight, III
*Assistant Examiner*—Rabon Sergent
*Attorney, Agent, or Firm*—Michael Leach; James C. Simmons; William F. Marsh

[57] ABSTRACT

Preparation of a polyurethane and/or polyisocyanurate product by the reaction of a composition containing an organic polyisocyanate, an active hydrogen containing compound and water as a blowing agent using an effective amount of a molecular sieve containing sorbed amine catalyst and/or crosslinker.

20 Claims, No Drawings

CONTROLLED RELEASE CATALYSTS AND CURING AGENTS FOR MAKING POLYURETHANE AND/OR POLYISOCYANURATE PRODUCT

CROSS-REFERENCE TO RELATED APPLICATIONS

This application is a continuation-in-part of application Ser. No. 07/345,399 filed on May 1, 1989, now abandoned.

TECHNICAL FIELD

This invention relates to the use of amine-containing catalyst systems for the reaction involving organic polyisocyanates and polyols in the production of polyurethane products.

BACKGROUND OF THE INVENTION

In the polyurethane industry there is a need for delayed action catalysts, i.e. catalysts that will delay the onset (initiation time) of the isocyanate-polyol reaction (gelling reaction) or isocyanate-water reaction (blowing reaction) while not substantially affecting the time to the end of the reaction, or the final cure. Additionally, a need exists either to protect the amine catalyst from acidic additives such as halogenated flame retardants or, the converse, to provide efficient cure in the presence of such acidic additives.

In practice, the production of molded polyurethane foam articles requires the use of delayed initiation catalysts. They are necessary in order to fill the mold with the wet chemical foam composition and permit mold lid closing before the rising foam reaches the part line of the mold. Catalysts typically used for this purpose are acid blocked tertiary amines, that is to say tertiary amines 30-90 mole % neutralized with an acid.

The disadvantages of using such delayed initiation catalysts are (a) the formation of equilibrium salts with amine crosslinkers, which are used to provide stability and contribute load bearing in the foam product, resulting in unstable foam exemplified by very coarse cell structure and (b) the drift in reactivity with time that is shown by the underdevelopment of green strength at demold. Also, the use of acid-blocked amine catalysts necessary for processing efficiency greatly reduces the processing latitude available to the polyurethane producer.

As presently practiced, these delayed catalysts are tertiary amine compositions having some type of chemical adduct formation. Each type of adduct presents problems to the end user. For example, in acid or phenolic blocked amine catalysts, the substitution of stronger or weaker acids has been tried without success. The stronger acids extend the delay of initiation to an unacceptable time while the weaker acids do not provide sufficient delay. Reduction of tertiary amine catalyst levels is partially successful but at a cost of increased cure times or higher oven temperatures, both of which cause other operating problems.

Manufacturers of polyurethane foam typically use masterbatches, or premix compositions, consisting of one or more polyols plus water, amine catalysts and, optionally, cell stabilizers, organometallic salts, flowing agents, crosslinkers, dyes or pigments and flame retardants. These are known as the "B" side components. Depending on the size of the individual molding plant, the masterbatches may be consumed in as short as 2-4 hours or as long as 4-5 days. Some of the typically used polyol masterbatches containing an acid blocked amine catalyst package rapidly change in reactivity when used over several days. Typically after several hours storage, especially in water-containing masterbatches, this reactivity drift becomes apparent. Thus, low to moderate volume molders generally will consume their masterbatches over 2-4 days and experience the cure drift problem.

Also, within a few hours of using a masterbatch containing acid blocked amines the rising foam loses sufficient stability and begins to exhibit cell coarsening that leads to cell collapse, especially under the bleeder vents, producing very large cells as well as extending the cure time. This condition is known in the industry as "Monday morning foam."

A typical approach to solving this problem in the molding of polyurethane foam is to have a skeleton staff make the masterbatch on Sunday night before production starts or to make a short batch on Friday to prevent having any masterbatch stand over the weekend and losing reactivity.

U.S. Pat. No. 3,036,980 discloses curing organic resins and elastomers using a latent curing agent which includes a volatile curing compound that is released by heating or otherwise during a curing reaction. A zeolitic molecular sieve acts as a carrier for the curing compound.

U.S. Pat. No. 3,384,680 discloses that polyepoxides and polyurethanes may be cured by encapsulated curing agents. The curing agent is adsorbed on an adsorbent having internal pore structure and active pore sites. The absorbent is coated with a shielding agent adsorbed into the adsorbent. The shielding agent is intended to prevent the slow escape of the curing agent from the absorbent or its interaction with other components in the composition.

U.S. Pat. No. 3,417,046 discloses the use of a release agent to improve the release of active chemical curing agents previously absorbed in crystalline zeolitic molecular sieves. It is taught that water displaces the curing agent from the molecular sieve. Since water is so strongly absorbed by the molecular sieve, the curing agent is rapidly released leading to premature release effects (curing).

U.S. Pat. No. 3,499,864 discloses one-part polymer compositions comprising (a) a curable, liquid polythiol polymer, (b) a dormant amine activatable curing agent, (c) a desiccating, hydroscopic accelerating agent, and (d) an amine-loaded molecular sieve, which are characterized by excellent storage stability at temperate ambient temperatures (in the absence of moisture) and undergo relatively fast cures when exposed to moisture of a moisture-laden atmosphere, are improved and rendered storage stable at elevated ambient temperatures by containing in the compositions (e) a stabilizing amount of elemental sulfur. The desiccating agent is needed to prevent premature release of the amine from the molecular sieve by extraneous moisture.

U.S. Pat. No. 3,528,933 discloses a curable resin composition comprising a flowable, curable resin and a latent curing agent distributed throughout the resin within a solid, stable organic crystalline inclusion compound unreactive in the crystalline form with the resin. The inclusion compound is a crystalline host material and contains within the crystalline structure a guest material which will cure the resin when released from the crystalline structure by heat or other means.

U.S. Pat. No. 4,341,689 discloses a two component polyurethane coating system in which the pot life is extended (about six hours) and is cured by exposure to atmospheric moisture in about an hour or two. The cure is accelerated by the presence of an organotin accelerator. It is also taught that water rapidly replaces amine catalysts from molecular sieves. No water is contained within the formulations. A catalyst-molecular sieve intermediate is prepared by mixing diazo bicyclooctane (triethylenediamine) catalyst with a 13X zeolite (NaX zeolite).

U.S. Pat. No. 4,518,718 discloses a closed cell rigid polyurethane foam which contains up to about 60% by weight of molecular sieves capable of sorbing molecules with effective critical diameters of up to about 10 Angstroms. The molecular sieve component of the foam can be preloaded with catalysts or with reactive compounds that can be released upon activation of the foam to control and complete crosslinking after the foam is formed. There is no free water present in the foaming composition. In the presence of large quantities of molecular sieves or zeolites, as is the case in the '718 invention, all of the water is absorbed by these desiccants at the time foaming should occur. Consequently, satisfactory expansion of the reaction mixture is accomplished by incorporating into it alternate blowing agents such as the halocarbons.

U.S. Pat. No. 4,707,501 discloses a polyurethane foam catalyst composition that eliminates polyurea-containing polyol based masterbatch cure drift.

FR 2,587,710 discloses an anhydrous zeolite which does not absorb nitrogen, is used in a polyol composition as a moisture absorber and stabilizer which prevents excessive decreases in the pot life of mixtures of the polyol and a polyisocyanate during the preparation of solid polyurethanes and prevents water-promoted generation of carbon dioxide and the resulting formation of voids in the polyurethanes during polymerization.

SUMMARY OF THE INVENTION

The present invention provides for the preparation of a polyurethane product, preferably a cellular polyurethane product by the reaction of an organic polyisocyanate with an active hydrogen containing compound and water as a blowing agent using a catalyst composition of one or more amines sorbed into a microporous host (molecular sieve). These compositions provide the necessary delay in the gelling and/or blowing reactions needed for molded applications and impart improved stability to the premix compositions compared to conventional catalysts. The sorbed amines may function as catalysts or crosslinkers in molded foam applications. In both cases the molecular sieve containing the sorbed amine is used in an amount effective for catalysis or crosslinking, i.e. less than about 5 wt. % based on active hydrogen containing compound.

A key advantage of the invention is the use of an amine catalyst sorbed into a suitable molecular sieve to provide the necessary delay in initiation without sacrificing the quality or physical properties associated with the polyurethane product.

As an advantage of the invention, the use of amine catalysts, preferably tertiary amines, sorbed into microporous hosts provides the necessary delay in initiation without sacrificing stability, reactivity or any physical properties over the typical use levels practiced in the polyurethane foam industry. This combination of sorbed amine catalyst and microporous host at ambient conditions provides a catalyst system in which the amines are unreactive to other components in the polyurethane formulation, i.e. no drift in the reactivity over the normal life of a masterbatch.

The present invention produces a delayed initiation by a few seconds of the gelling and/or blowing reactions during urethane formation and renders a stable masterbatch in contrast to acid blocked amines that cause masterbatch instability. This is accomplished by "encapsulating" the amine in a suitable molecular sieve host. These encapsulated catalysts maintain a substantially uniform reaction profile including the front-end delay over the useful life of the premix composition. For flexible molded foam applications, the present useful life of the premix is up to four days. This invention extends the useful life of the premix to about a week.

In a commercial operation, it may be advantageous to suspend the catalyst composition in a liquid, such as a polyol, glyme or diglyme, and add the suspension to the masterbatch.

None of the prior art suggests that incorporation of catalyst or other reactive additives into molecular sieve hosts provides the desired delay in the initiation of the gelling and/or blowing reactions and can be accomplished in the presence of water over an extended period.

The prior art teaches that the inclusion of greater than 10 wt. % zeolite in the polyurethane or other polymer formulation imparts a desiccating property to the polymer matrix after the foam is formed. In fact, the '718 patent discloses the utility of zeolite loaded polyurethanes to modify their water absorption properties by the use of up to 60 wt. % zeolite. The '718 patent further teaches that these zeolites can be preloaded with small polyfunctional active hydrogen containing molecules which can react after the foam forming reaction is complete. The catalyst compositions of the present invention are used at less than 2 wt. % of the final formulation and initiate the foam forming reaction(s).

The present catalyst compositions provide stability for at least two weeks to premix compositions containing up to 7 wt. % water needed to react with attendant isocyanate to produce $CO_2$ as a blowing agent. Also, the present invention does not require the use of shielding agents as in the '680 patent or special release agents as in the '046 patent.

As another advantage, encapsulating the amine lowers the exposure levels in the work place. Loading hazardous amine catalysts into the sorbant permits their use by reducing the exposure level of these chemicals to personnel. This would allow the use of such high performance chemicals in formulations currently not used.

DETAILED DESCRIPTION OF THE INVENTION

The method for preparing polyurethane product according to the invention involves the use of a particular catalyst system which consists essentially of a microporous host containing pores that are large enough to accommodate an amine polyurethane and/or polyisocyanurate catalyst or crosslinker. For purpose of this invention the term "polyurethane" includes polyisocyanurate product.

The microporous host useful in this invention includes all materials either organic or inorganic which are considered molecular sieves. For the purposes of this invention the term "molecular sieve" or "microporous host" means any microporous material which discriminates between molecules on the basis of size. In order for the molecular sieve host to be effective it must entrap a major portion of the amine in a micropore where it is inaccessible to larger sized components of the premix composition which generally comprises relatively large prepolymers of one type or another which are too big to replace or dissolve the amine from the micropore. Typically, the appropriate hosts for this application will have micropores or pore windows having a diameter between about 5 to 20 Angstroms.

Molecular sieves useful in this invention are envisioned to include zeolites, clays, carbons, including activated carbons, small pore amorphous metal oxides, aluminophosphates of various kinds including those containing other elements incorporated into the aluminophosphate framework and the like. Not all clays or amorphous metal oxides have micropores small enough to be effective, but certain ones do, such as pillared clays with interlayer spacings of less than 20 Angstroms and small pore, desiccant grade silica gels.

Zeolites are preferred as hosts since they have not only the size restricting pore windows but also a large internal volume. This internal volume arises from their regular structure. Zeolites are crystalline metal aluminosilicates which in the dehydrated form have stable three dimensional networks of $SiO_4$ and $AlO_4$ tetrahedrons providing intracrystalline voids which are interconnected by access openings or pore windows of uniform size. The electrical neutrality of the zeolite is maintained by the inclusion of positively charged cations in the structure. Alkali metal or alkaline earth metal cations are very common but any metal cation could be present. The most preferred forms of zeolites for this invention are sodium, potassium and calcium.

A wide variety (over 100) of different synthetic and natural zeolites are known, most of which may have utility in this invention. The key requirement of the zeolitic host is that it has a substantial internal volume which is accessible to the catalyst or curing agent through a size restricting aperture. For most applications small pore zeolites such as A-type and chabazite will have pore windows too small to absorb the amine and therefore would not be useful. However, a crosslinker such as ethylenediamine (used in reaction injection molded polyurethane or polyurea compositions) or 1,4 butanediol (used in elastomers, shoesoles and coatings) will absorb in these small pore zeolites and could be effective.

Generally, however, medium pore and large pore zeolites are preferred with X- and Y-types being more preferred. It is well known that X-type zeolite will absorb molecules having effective diameters up to 10 Angstroms but exclude larger molecules. The combination of a high internal void volume (50%) and the commercial availability of NaX (also known as 13X) and NaY make them the preferred hosts for this application.

Although the polyurethane compositions often contain water as a blowing agent, the microporous hosts are not added as desiccants to remove this water and in the practice of the present invention could themselves contain up to 5 wt. % water or solvent. In the cellular plastic-forming compositions of the present invention, water is the blowing agent with or without chlorofluorocarbons as auxiliary blowing agents.

The amines that can be internally sorbed into the microporous hosts are any of those amines that are used to catalyze the reaction between an isocyanate and a material having an active hydrogen as are well known in the polyurethane art. Examples of suitable amines include the following:
Triethylenediamine (TEDA)
Bis(dimethylaminoethyl)ether (BDMAEE)
Dimethylaminoethanol
Dimethylaminoethyl-N-methylethanolamine
Diethylaminoethoxyethanol
Dimethylaminoethylmorpholine
N-Ethyl-morpholine
2-methyl-4-ethyl imidazole
4-methyl imidazole
Tris-2,4,6,-Dimethylaminomethylphenol
Pentamethyldiethyltriamine
N,N-Dimethylcyclohexylamine
Tris-(dimethylaminopropyl)amine
Dicyclohexylmethylamine
Bis(dimethylamino)propylamine
Dimethylaminopropyl-N-methylpropanol
Tris(dimethylaminopropyl)triazine
Methoxypropylmorpholine
Bis(dimethylaminopropyl)methylamine
Diemthylaminopropylamine
1,8-Diazabicyclo(5,4,0)undecene-7
Diglycolamine
Dimethylpiperazine
Methoxymethylmorpholine
Bis[2-(morpholine)-ethyl]ether
N,N,N", N"'-tetramethyl-N'-2-hydroxypropyldiethyltriamine
N-dimethylaminoethyl-N-methylpiperazine
Tetramethylethylenediamine
N,N-Dimethylaminoethyl-N', N'diemthylaminopropylether
N,N,N'N'-tetramethylbutanediamine
N-cocomorpholine
Triethylamine
N,N,N',N'-tetramethylhexanediamine
1-(2-hydroxyethyl)-4-methylmorpholine
1-(2-hydroxyethyl)-4-methylpiperazine
Tetramethyl-2-hydroxypropyldiamine
Hydroxyethylmorpholine
Bis(dimethylaminopropyl)ethyleneglycolether
Tetramethylguadinine
Hexamethyltriethyltetraamine
Dimethylaminopropylimidazole
Dimethylbenzylamine
Dimethylhexadecylamine Contemplated as the functional, or operative, equivalent of the tertiary amine for purposes of this invention are quaternary amines typically used in the urethane industry such as those taught in U.S. Pat. Nos. 3,993,652; 4,116,879 and 4,582,861. It is also contemplated that the sorbed amine may be in the form of an amine salt.

Illustrative of quarternary amine compounds typically used to catalyzed the polymerization of the isocyanate functionality to form the isocyanuarate groupings are the following:
N,N-Dimethyl-2-hydroxypropyl ammonium formate
N,N-Dimethyl-2-hydroxypropyl ammonium cyanoacetate
N,N-Dimethyl-2-hydroxyethyl ammonium-2-ethyl hexanoate N,2-Hydroxypropyl triethylenediamine-2-ethyl hexanoate N,N,N',N'N''-Pentamethyl diethylenetriamine formate The amount of the amine that is sorbed into an amount of the molecular sieve host may be such as to substantially fill the pores of the host in order to minimize the amount of host added to the polyurethane composition. Suitably, the microporous host would contain 5 to 25 wt. % amine, or more depending upon the particular host material, preferably 15 to 25 wt. % and desirably about 20 wt. %. Obviously, it is not necessary to substantially fill the pores with amine catalyst in order to practice the invention and it is preferred to use partially filled hosts because such catalyst compositions demonstrate superior thermal stability. For the preferred NaX and NaY host, the zeolite's saturation capacity is about 20 wt. % for triethylenediamine (TEDA).

The amine-loaded host can be prepared by absorbing the amine into the host from either the vapor or liquid phase. Any method suitable for contacting a molecular sieve host with the amine is satisfactory. The amine can be absorbed from the vapor phase directly or be removed from an amine entrained gas stream using an inert gas, such as nitrogen, as a carrier. A preferred way of sorbing solid amines such as triethylene-diamine into molecular sieves is to blend the appropriate portions of the amine and dry host together. Liquid amines can be absorbed directly into the molecular sieve or selectively sorbed from a wide variety of organic solvents. Any organic liquid in which the amine catalyst is soluble may be used, but it is preferred to use the lower boiling solvents such as alkyl alcohols (methanol), ethers (methyl t-butyl ether), hydrocarbons (pentane) and the like to facilitate drying of the product. The mixture of the molecular sieve and the organic solution is stirred for a time sufficient to effect the desired loading with the tertiary amine after which the solid catalyst can be isolated by filtration and drying, preferably under a stream of nitrogen.

A catalytically effective amount of the catalyst system according to the invention is used in the polyurethane formulation comprising organic polyisocyanate, organic polyol, preferably polyether or polyester polyol, water and, optionally, cell stabilizer such as silicone surfactants. In practice, the catalyst system would be added to, or present in, the masterbatch comprising the organic polyol, water and, optionally, cell stabilizer. More specifically, suitable amounts of the catalyst system may range from about 0.2 to 2.5 parts, preferably 0.5 to 1.5 parts, per 100 parts polyol in the polyurethane formulations.

Examples of suitable organic polyisocyanates are hexamethylene diisocyanate, isophorone diisocyanate, phenylene diisocyanate, toluene diisocyanate, and 2,4' or 4,4'-methanediphenyl diisocyanate. Especially suitable are the 2,4- and 2,6-toluene diisocyanates, individually or together as their commercially available mixtures. Other suitable mixtures of diisocyanates are those known commercially as "crude MDI", also known as PAPI, which contain about 60% of 4,4'-diphenylmethane diisocyanate along with other isomeric and analogous higher polyisocyanates. Also suitable are "prepolyers" of these polyisocyanates comprising a partially pre-reacted mixture of polyisocyanates and diols, polyether polyols or polyester polyols.

Illustrative of suitable polyols as a component of the polyurethane formulations catalyzed by the catalyst systems of the invention are the polyalkelene ether and polyester polyols with or without residual acids. The polyalkylene ether polyols include the poly(alkyleneoxide) polymers such as poly(ethyleneoxie) and poly(propyleneoxide) polymers and copolymers with terminal hydroxyl groups derived from polyhydric compounds including diols, triols, for example, among others, ethylene glycol, propylene glycol, 1,3-butanediol, 1,4-butanediol, 1,6-hexanediol, neopentyl glycol, diethylene glycol, dipropylene glycol, pentaerythritol, glycerol, diglycerol, trimethylol propane, cyclohexane diol and like low molecular weight polyols such as polytetramethylene ether glycols.

Useful polyester polyols include those produced by reacting a dicarboxylic acid with an excess of a diol, for example, adipic acid with ethylene glycol or butanediol, or reacting a lactone with an excess of a diol such as caprolactone and propylene glycol or derived from recycled polyethene terphthalate polymers, or dimethyl terphthalate bottoms or phthalic anhydride. All are characterized as containing varying amounts of free acids capable of reacting with tertiary amines to form catalytically retarded or inactive species.

In addition to the polyether and polyester polyols, the masterbatches, or premix compositions, frequently contain a polymer polyol. Polymer polyols are used in polyurethane foam to increase the foam's resistance to deformation, i.e. to increase the load bearing properties of the foam. Currently, two different types of polymer polyols are used to achieve load bearing improvement. The first type, described as a graft polyol, consists of a triol on which vinyl monomers are graft copolymerized. Styrene and acrylonitrile are the usual monomers of choice. The second type, polyurea modified polyols, is a polyol containing a polyurea dispersion formed by the reaction of a diamine and toluenediisocyanate (TDI). Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load bearing requirements, polymer polyols may comprise 20 to 80% of the polyol portion of the masterbatch.

Other typical agents found in the polyurethane formulations include blowing agents (besides water), such as methylene chloride, trichlorofluoromethane and the like, and cell stabilizers such as silicones.

General polyurethane foam formulations would comprise the following:

| POLYURETHANE FOAM COMPOSITIONS | | |
|---|---|---|
| Component | General pbw | Molded Foam pbw |
| Conventional Polyol (2000 to 6000 mol wt) | 0 to 100 | 20 to 100 |
| Polymer Polyol | 0 to 80 | 0 to 80 |
| Cell Stabilizer | 0 to 6 | 0 to 2 |
| Organometallic Catalyst | 0 to 2 | 0 to 0.2 |
| Water | 1 to 7 | 2 to 5 |
| Blowing Agent | 0 to 25 | 0 to 15 |
| Invention Catalyst | 0.2 to 2.5 | 0.5 to 1.5 |
| Isocyanate Index | 85 to 600 Index | 85 to 115 Index | pbw = parts by weight
The first seven components comprise the masterbatch.

The masterbatch whose temperature it typically 65° to 110° F. but usually 70° to 75° F., and the isocyanate typically held at 70° to 80° F., but may be run as high as 100° F., are mixed in commercial high or low pressure machines for 0.5 to 10 seconds before being injected into the mold or poured onto the slab line bed. The mold temperature can range from ambient to 170° F., typically 110° to 155° F. The mold is closed to prevent foam from escaping. Depending upon the application/mold temperature, the cured foam will be removed from the mold in as short as one minute to 30 minutes. The typical foam residence time is 2 to 8 minutes. The demolded foam is sufficiently cured at demold to be handled without accepting any deformation.

There are a large variety of applications in polyurethane systems where this invention has utility. Essentially, anytime it is desirable to delay the release of a catalyst or crosslinker from the masterbatch, or "B" component, in a polyurethane formulation. These include slab stock applications and many molded applications such as flexible molded automobile seating, shoe sole production, applicant housings, reaction injected molded automotive fascia, semi-rigid molded interior automotive components such as dashboards, armrests, headliners or door panels and aircraft seating/trim components.

The basic concept of removing a reactive component from an environment where it adversely affects the storage stability, or shelf-life, of the polymer formulation but is available during the desired phase of the polymer forming reaction has broad implications. A wide variety of polymer additives should be amenable to this approach. Organotin polyurethane catalysts encapsulated in a microporous host are particularly attractive. It is contemplated in its broader aspects that the present invention includes the sorbing of other additives such as tin catalysts, crosslinkers, mold release agents and flame retardants into the microporous hosts including other host substrates such as carbons, coiled polymers and microcapsules made from a variety of polymeric materials. Additionally, silicone oils or other cell stabilizers may be incorporated into microporous hosts to provide cell opening effects at the end of the curing cycle.

Also, applications of encapsulated reagents for other non-urethane polymer systems are envisioned, such as producing stable epoxy systems containing an amine accelerator or encapsulating peroxides to initiate a variety of radically induced polymerizations.

EXAMPLE 1

The following is a typical method for preparing a catalyst system of a microporous inorganic oxide containing sorbed tertiary amine catalyst:

Triethylenediamine (TEDA; 600 g) was dissolved in reagent grade methanol (600 ml) which had been pre-dried over 3A zeolite. Linde NaX zeolite (150 g) containing less than 1% water was slowly added to the methanol solution. The slurry was mechanically stirred for 17 hours under a nitrogen atmosphere. The amine laden NaX zeolite was isolated by filtration and dried at ambient temperature under vigorous purge of nitrogen. Potentiometric titration of the dry product showed that 20.8 wt. % TEDA had been sorbed into the NaX zeolite.

Using a similar procedure, bis(dimethylaminoethyl)ether (BDMAEE) and bis(dimethylaminopropyl)methylamine (BDMAPMA) were also sorbed into NaX zeolite from concentrated methanol solutions.

EXAMPLE 2

Four pounds of commercial NaX zeolite powder are charged into an 8 quart twin shell laboratory scale liquid-solids blender containing an internal intensifier bar. To the NaX powder, one pound of commercial TEDA is charged. Blending begins with the twin shell operating at 24 rpm and the internal intensifier bar operating at 2488 rpm. Within 5 minutes of the onset of mixing, the material in the blender combines spontaneously and generates an exotherm, heating from ambient temperature to approximately 180° F. One to two hours are required for the material to cool to ambient temperature. Care is taken to minimize contact of the materials with water or humid environments before and after blending. The blender chamber is sealed from the environment during the blending process. The blend that results contains 20% TEDA.

Of course, differing amounts of a variety of amines can be sorbed onto molecular sieves using this procedure. See also U.S. Pat. No. 4,341,689.

EXAMPLE 3

In order to evaluate the catalysts of the invention a masterbatch (#1) was prepared by blending together the following components:

| MASTERBATCH #1 | |
|---|---|
| | pbw[c] |
| Multranol E-3901[a] | 50 |
| Multranol E-9151[b] | 50 |
| DC-5043 silicone surfactant | 1.5 |
| Diethanolamine (DEOA) | 1.7 |
| Water | 3.8 |
| Catalyst | See Table 1 |

[a]6000 mol wt triol EO capped
[b]6000 mol wt filled polyol containing a polyurea dispersion (approx. 20 wt %)
[c]parts by weight Sufficient masterbatch containing each catalyst system as set forth in Runs A-G in Table 1 was made to allow for the making of three foams. The first foam was made 2 hours after the masterbatch (MB) was prepared. The second foam was made 26 hours later and the last foam was made 74 hours later. Each foam was prepared by mixing the catalyst-containing masterbatch with an appropriate amount of toluene diisocyanate to yield an Isocyanate Index of 100 and then poured into a preheated mold at 140° F.

All the foams were made in an 8"×9"×4.5" aluminum mold whose lid contained five ¼" holes drilled on 1.75" centers in a line one inch from the edge of the mold. The purpose of the five vents is to accentuate the pressure relief stress on the rising foam under the vents. An unstable foam made in this mold will collapse. In contrast, a stable rising foam will form a rectangular block of foam with no indication of collapse under the vents.

The mold was placed into an oven with an air temperature of 160°-200° F. for 5.5 minutes. The mold was removed and the foam removed from the mold. The foam was cut through the five vents portion of the foam to yield a cross section beneath each vent and graded for vent stability as set forth in Table 2 which also presents the normal response parameters of cream time, extrusion time and string gel time. A rating of 3 was considered a perfect foam with no distortion of the cells immediately under the vent. A rating of zero was assigned to a foam with complete collapse.

All the catalysts were evaluated using masterbatch #2. The catalyst-containing masterbatch was used with an appropriate amount of toluene diisocyanate (TDI) to yield an Isocyanate Index of 102±0.5. The percent water in each polyol and other additives was included in establishing the Isocyanate Index.

TABLE 1

| CATALYST | wt % AMINE | RUN-CATALYST LEVEL (php)[e] | | | | | | |
|---|---|---|---|---|---|---|---|---|
| | | A | B | C | D | E | F | G |
| DABCO 33-LV ®[a] | 33 | 0.35 | — | 0.35 | — | 0.35 | — | — |
| DABCO ® 8154[b] | 30 | — | 0.38 | — | — | — | — | — |
| DABCO BL-11[c] | 70 | 0.12 | 0.12 | — | 0.12 | — | — | — |
| DABCO BL-17[d] | 54 | — | — | 0.16 | — | — | — | — |
| TEDA/NaX Zeolite | 21 | — | — | — | 0.45 | — | 0.45 | 0.30 |
| BDMAEE/NaX Zeolite | 22 | — | — | — | — | 0.32 | 0.32 | — |
| BDMAPMA/NaX Zeolite | 19 | — | — | — | — | — | — | 0.15 |

[a]TEDA in dipropylene glycol.
[b]TEDA in dipropylene glycol; plus 2-ethylhexanoic acid/formic acid and N,N-Dimethylaminoethyl-N'-methylethanolamine.
[c]BDMAEE in dipropylene glycol.
[d]BDMAEE and formic acid in dipropylene glycol.
[e]All runs used masterbatch #1 at 106.8 pbw.

TABLE 2

| | RUN | | | | | | |
|---|---|---|---|---|---|---|---|
| | A | B | C | D | E | F | G |
| MB Aged 2 Hr Time (Sec) | | | | | | | |
| Cream | 9 | 13 | 12 | 12 | 11 | 12 | 12 |
| Extrusion | 42 | 51 | 49 | 59 | 44 | 59 | 53 |
| String Gel | 54 | 65 | 62 | 73 | 54 | 71 | 63 |
| Stability | 2.7 | 1.8 | 2.5 | 2.0 | 2.2 | 2.7 | 2.7 |
| MB Aged 26 Hr Time (Sec) | | | | | | | |
| Cream | 11 | 13 | 15 | 12 | 11 | 12 | 11 |
| Extrusion | 48 | 55 | 56 | 51 | 49 | 52 | 55 |
| String Gel | 59 | 66 | 69 | 62 | 59 | 65 | 66 |
| Stability | 2.5 | 1.0 | 2.0 | 2.5 | 2.5 | 2.5 | 2.5 |
| MB Aged 74 Hr Time (Sec) | | | | | | | |
| Cream | 9 | 13 | 13 | 11 | 11 | 11 | 12 |
| Extrusion | 55 | 58 | 56 | 54 | 49 | 57 | 58 |
| String Gel | 63 | 68 | 68 | 65 | 60 | 65 | 69 |
| Vent Stability | 2.7 | 0.5 | 1.0 | 2.6 | 2.6 | 2.8 | 2.8 |

Vent Stability Rating: Perfect Stability = 3.0 Very Good = 2.5 Good = 2.0 Acceptable = 1.5 Unacceptable = 1.0 Complete Collapse = 0.0

The data in Table 2 clearly show that the catalyst absorbed into the NaX zeolite (Runs D-G) maintained initiation delay, uniformity of reaction times and foam quality. The foams prepared using the acid-blocked catalysts (Runs B and C) showed degradation of the foam quality.

This example demonstrates that encapsulation of either the blowing catalyst or gelling catalyst markedly improves the stability of the premix composition. (Compare Runs A-C with Runs D-G). Encapsulating both the blowing and gelling catalysts may provide an improvement beyond the use of a conventional blowing or gelling catalyst combination with an encapsulated catalyst.

It is reasonable to expect that the reactivity profile for a particular catalyst or crosslinker may be varied to optimize a given process by varying the relative amounts of the amine(s), mold temperature or other process parameters.

EXAMPLE 4

In this Example the performance of TEDA/NaX zeolite as a delayed action catalyst in a premix for molded foam is compared to acid blocked TEDA at equivalent TEDA levels. The level was chosen to be that typically used to obtain fast demold times, such as 3 minutes. A standard high pressure foam machine was used for the evaluation.

| MASTERBATCH #2 | | |
|---|---|---|
| Component | OH # | pbw |
| Multranol E-9143 | 35 | 50.00 |
| Multranol E-9151 | 28 | 50.00 |
| Diethanolamine | 1603 | 1.50 |
| Water | 6233 | 3.80 ± 0.05 |
| DC5164 | | 1.00 |
| Gel Catalyst | | See Table 3 |

The stream temperature of both the A-side (TDI) and B-side (masterbatch) was 73°±1° F. The pour or shot times were 2.4 seconds for the flow mold and 0.81 seconds for the step mold. The mold temperature at pour was 140°±2° F. and the foam pads were demolded after 4.5 minutes.

All catalysts were added to provide 0.167 parts TEDA per hundred parts polyol (0.167 php TEDA) to the masterbatch. Bis(dimethylaminoethyl) ether (BDMAE) at 0.105 php was included in each Run except Run D. Run D had 0.167 php TEDA and 0.105 php BDMAEE added, each sorbed into NaX zeolite. In Run E, the NaX zeolite and the Dabco 33-LV catalyst were added simultaneously but separately.

The cream time data are the combined values of six pours; three into the flow mold and three into the step mold. The data were collected on Day 0 (minimum of 2 hours mixing before pouring), Day 1, Day 2 and Day 10.

TABLE 3

| | | Masterbatch Age - Days | | | |
|---|---|---|---|---|---|
| | | 0 | 1 | 2 | 10 |
| Run | Catalyst (php) | Cream Time (sec) | | | |
| A | DABCO 33-LV (0.50) | 3.5 | 3.5 | 3.5 | 4.2 |
| B | DABCO 8154 (0.56) (Acid-blocked) | 3.6 | 4.4 | 4.0 | 4.3 |
| C | TEDA/NaX (0.83) | 4.1 | 4.1 | 4.1 | 3.8 |
| D | TEDA/NaX+ (0.83) BDMAEE/NaX (0.52) | 3.7 | 3.8 | 4.0 | 4.4 |
| E | NaX ZEOLITE+ (0.67) DABCO 33-LV (0.50) | 3.7 | 3.7 | 3.5 | 3.2 |

The data in Table 3 shows the following:
1. The TEDA/NaX zeolite catalyst (Run C) produced a more uniform delayed cream time than that obtained by the industry standard, DABCO 8154 catalyst (Run B).

2. Both DABCO 8154 catalyst (Run B) and TEDA/-NaX zeolite catalyst (Run C) delayed the cream time of the masterbatch compared to DABCO 33-LV catalyst (Run A) at the same TEDA level.

3. The simultaneous addition of DABCO 33-LV catalyst and NaX zeolite (Run E) did not delay the cream time of the masterbatch.

4. The combination of TEDA/NaX zeolite and BDMAEE/NaX zeolite (Run D) did not delay the cream time as much as TEDA/NaX zeolite along (Run C) but provided a delay cream time compared to DABCO 33-LV catalyst (Run A).

The foams produced were evaluated for cure by a 10 second clamp test. A welder's clamp with a 1 inch×4 inch foot was used to compress the freshly demolded foam to 10% of its original height. After 10 seconds the clamp was opened and removed from the foam. The compressed foam was allowed to recover for 24 hours. The compressed height after the 24 hr. relaxation as compared to the original height and the result was reported as the % of the original height. Values greater than 70-75% recovery indicate the foam had acceptable green strength. Table 4 shows the results of the various foam products tested.

TABLE 4

| | | Masterbatch Age - Days | | | |
|---|---|---|---|---|---|
| | | 0 | 1 | 2 | 10 |
| Run | Catalyst | % Recovery | | | |
| A | DABCO 33-LV | 100 | 63 | 83 | 69 |
| B | DABCO 8154 | 100 | 89 | 89 | 25 |
| C | TEDA/NaX | 90 | 60 | 87 | 74 |
| D | TEDA/NaX + BDMAEE/NaX | 67 | 40 | 33 | 25 |

Over the period tested only the control DABCO 33-LV catalyst and the TEDA/NaX zeolite catalyst maintained acceptable green strength. The acid blocked catalyst (DABCO 8154) exhibited severe loss of green strength between 2 and 10 days. The combined TEDA/NaX and BDMAEE/NaX zeolite catalysts did not achieve acceptable green strength at the 4.5 minute demold time although delayed initiation was achieved. Acceptable green strength could be attained with this catalyst system by varying the relative amounts of TEDA/NaX and BDMAEE/NaX and/or increasing the concentration or the mold temperature.

EXAMPLE 5

Lower loadings of TEDA/NaX zeolite can be produced by varying the concentration of the impregnating solution and/or the sorption time. For example, a 17 wt. % TEDA/NaX zeolite was prepared by rolling for 20 hr. a mixture comprising NaX zeolite (100 g), methanol (498 g) and TEDA (92 g). A NaX zeolite containing 11.4 wt. % TEDA was prepared in a similar manner using methanol (546 g) and TEDA (44 g). Using methyl t-butyl ether (MTBE) as the solvent greatly reduces the amount of TEDA needed to produce the desired loading. For example, combining NaX zeolite (0.5 g), MTBE (5.8 g) with TEDA (2.22 g) resulted in an 18.9 wt. % TEDA/NaX zeolite product.

EXAMPLE 6

Table 5 shows the TEDA loadings (determined by potentiometric titration with HCl) for a variety of microporous hosts. In each case (Catalysts 3-11) the dehydrated host (100 g) was combined with dried 55 wt. % TEDA in methanol (333 g TEDA/263 g MeOH) and rolled for 20 hr.

TABLE 5

| Catalyst | Host | Source | TEDA (wt %) |
|---|---|---|---|
| 1 | Dipropylene glycol | DABCO 33-LV | 33 |
| 2 | Dipropylene glycol/acid | DABCO 8154 | 30 |
| 3 | Kaolinite | Englehardt | 17.2 |
| 4 | Silicalite | Linde S-115 | 24.8 |
| 5 | Coconut shell carbon | Sutcliffe Speakman 203C | 19.6 |
| 6 | Small pore silica gel | Davidson 951 | 30.9 |
| 7 | Sodium X zeolite | Linde 13X | 10.9 |
| 8 | Sodium Y zeolite | Linde LZY-52 | 16.6 |
| 9 | Calcium X zeolite | Ca exchanged Linde 13X | 17.0 |
| 10 | Calcium Y zeolite | Ca exchanged Linde LZY-52 | 25.9 |
| 11 | Sodium mordenite | Toyo Soda TSZ-600 Na | 6.8 |

EXAMPLE 7

This Example demonstrates the water-containing masterbatch stability of TEDA sorbed in various hosts.

Catalysts 1-11 of Table 5 were run in the following masterbatch identified as masterbatch #3.

| Masterbatch #3 | |
|---|---|
| | pbw |
| Multranol E-9143 | 70 |
| Multranol E-9151 | 30 |
| Diethanolamine | 1.7 |
| DC-5043 Silicone surfactant | 1.5 |
| Water | 4.0 |
| DABCO BL-11 | 0.12 |
| TEDA/host catalyst | varied |
| 80/20 Toluenediisocyanate | 102 index |

In this example, triethylenediamine (TEDA) was sorbed into a number of microporous hosts. The level of TEDA in each host was different. These catalysts were added to a portion of masterbatch #3 to form a lot of catalyzed masterbatch #3. Moldings were made initially, and after standing 5, 12, or 13, and 19 days at ambient temperature to determine reactivity and the rising foam stability of the catalyzed lots of masterbatch #3, which data is presented in Tables 6 and 7, respectively.

TABLE 6

| | Reactivities | | | | | | | | | | |
|---|---|---|---|---|---|---|---|---|---|---|---|
| | Catalyst | | | | | | | | | | |
| | 1 | 2 | 3 | 4 | 5 | 6 | 7 | 8 | 9 | 10 | 11 |
| Use level (php) | .35 | .38 | 1.06 | .78 | .65 | .39 | .78 | .93 | .93 | .39 | 1.17 |
| TEDA level (php) | .12 | .11 | .18 | .19 | .13 | .12 | .09 | .15 | .16 | .10 | .08 |
| Initial reactivity | | | | | | | | | | | |
| Extrusion Time (sec) | 32 | 38 | 32 | 39 | 31 | 30 | 39 | 45 | 46 | 41 | 41 |
| String Gel Time (sec) | 60 | 63 | 55 | 75 | 60 | 57 | 64 | 76 | 74 | 75 | 75 |
| Aged 5 days | | | | | | | | | | | |
| Extrusion Time | 35 | 36 | 31 | 28 | 32 | 32 | 37 | — | — | 37 | 37 |
| String Gel Time Aged 12 | 63 | 58 | 57 | 40 | 57 | 60 | 68 | — | — | 67 | 67 |

TABLE 6-continued

| | Reactivities | | | | | | | | | | |
|---|---|---|---|---|---|---|---|---|---|---|---|
| | Catalyst | | | | | | | | | | |
| | 1 | 2 | 3 | 4 | 5 | 6 | 7 | 8 | 9 | 10 | 11 |
| days | | | | | | | | | | | |
| Extrusion Time | — | — | — | — | — | — | — | 44 | 40 | — | — |
| String Gel Time | — | — | — | — | — | — | — | 71 | 68 | — | — |
| Aged 19 days | | | | | | | | | | | |
| Extrusion Time | 32 | — | 30 | — | 32 | — | 37 | NR | NR | — | — |
| String Gel Time | 61 | — | 58 | — | 58 | — | 81 | — | — | — | — |

The reactivity data demonstrates that the sodium X, sodium Y, calcium X, and calcium Y zeolites (Catalysts 7–10, respectively) all delayed the initiation of the foam as inferred by the extended extrusion time compared to TEDA (Cat 1) and were equivalent to the acid blocked TEDA (Cat 2). The kalinite, silicalite, coconut shell carbon, small pore silica gel and sodium mordenite (Cats 3–6 and 11, respectively) did not delay the foam initiation as inferred by extrusion times. This benefit, delayed initiation, is one of three desirable properties a catalyst must have to be commercially useful.

Table 7 demonstrates the effect of the sorbed TEDA on foam stability as measured by rating the vent stability of the cured foam.

TABLE 7

| Vent Stability | Catalyst | | | | | | | | | | |
|---|---|---|---|---|---|---|---|---|---|---|---|
| | 1 | 2 | 3 | 4 | 5 | 6 | 7 | 8 | 9 | 10 | 11 |
| Fresh Foam | 2.7 | 2.5 | 2.8 | 2.7 | 2.3 | 2.3 | 2.8 | 2.8 | 2.8 | 2.0 | 2.0 |
| Aged 5 days | 2.7 | F | 2.8 | 2.4 | 2.5 | F | 2.7 | — | — | F | F |
| Aged 12 days | — | * | — | — | — | * | — | 2.8 | 2.8 | * | * |
| Aged 13 days | 1.3 | * | 2.8 | 2.0 | 1.2 | * | 2.3 | — | — | * | * |
| Aged 19 days | F | * | 2.6 | F | F | * | 1.5 | — | — | * | * |

* = Experiment terminated.
F = 0 under Stability Rating.
See Table 2 for Stability Rating Sodium X, sodium Y, and calcium X zeolites (Cats 7–9) along with kaolinite (Cat 3) exhibited good foam stability over a 12 to 19 day period. Surprisingly, the industry standard TEDA (Cat 1) lost rising foam stability in the 13 to 19 day period. This stability test shows that the three zeolite catalysts have two of the necessary three desirable properties of a commercial catalyst. The kaolinite provides the necessary stability but lacks the required ability to delay initiation.

It is not known why the CaY and Na mordenite (Cats 10 and 11) failed in this example. See Example 11 which shows that CaY zeolite is acceptable for making foam using a different premix formulation.

With regard to catalyst stability, the silicalite, small pore silica gel and coconut shell carbon hosts quickly lost TEDA from their pores. This was seen by the rapid growth of TEDA crystals on the walls and lids of the glass bottles. The coconut shell carbon host lost TEDA within a few days, whereas the silicate and small pore silica gel hosts lost TEDA within a couple of weeks. The NaX, NaY and CaX zeolites did not lose TEDA over an eight week period when all were stored in closed plastic containers at 70°–75° F. and 50% relative humidity.

The above results show the TEDA/NaX, NaY and CaX zeolites meet the necessary three criteria to be an acceptable commercial molded foam catalyst as summarized in the following Table 8.

TABLE 8

| CATALYST | DELAYED INITIATION | FOAM STABILITY | CATALYST STABILITY |
|---|---|---|---|
| DABCO 8154 | Control | Control | Control |
| DABCO 33-LV | — | + | + |
| TEDA/Kaolinite | — | + | + |
| TEDA/Silicalite | —/o | + | o |
| TEDA/Coconut shell carbon | — | — | — |
| TEDA/Na Mordenite | —/o | + | + |
| TEDA/Small pore silica gel | — | o | — |
| TEDA/CaY zeolite | + | — | — |
| TEDA/NaX zeolite | + | + | + |
| TEDA/CaX zeolite | + | + | + |
| TEDA/NaY zeolite | + | + | + |

Comparison to DABCO 8154 catalyst: + = better; o = equivalent; — = poorer

EXAMPLE 8

This Example shows the stability of TEDA-loaded NaX zeolite (21%) in a water-containing masterbatch which includes the most severe test of water stability involving the intimate contact of the catalyst composition and water before mixing into the masterbatch. The formulation (identified as masterbatch #4) contained a styrene/acrylonitrile (SAN) copolymer instead of the polyurea based polyol.

| Masterbatch #4 | |
|---|---|
| | pbw |
| Pluracol 816 (5000 mol. wt triol) | 70 |
| Pluracol 1003 (5000 mol wt triol 22% SAN) | 30 |
| Diethanolamine | 1.7 |
| DC-5043 Silicone Surfactant | 1.5 |
| DABCO BL-11 | 0.10 |
| water | 4.2* |
| Toluene diisocyanate 80/20 | 102 index |

*a) The water was added either directly to the polyol masterbatch and mixed for 15 minutes followed by the TEDA/NaX zeolite or b) the water was poured onto the polyol masterbatch, allowed to pool on the top of the masterbatch, and the TEDA/NaX zeolite catalyst added so that the water and catalyst were in direct contact for at least two minutes before being mixed into the polyol masterbatch. The results of this study are shown in Table 9. DABCO 33-LV catalyst was run as the control (Run 3).

TABLE 9

| | Run | | |
|---|---|---|---|
| | 1 water, TEDA/NaX separately (a) | 2 water; TEDA/NaX together (b) | 3 water; TEDA separately (a) |
| TEDA level (php) | 0.09 | 0.09 | 0.12 |
| Initial pour 0 days | | | |
| Extrusion (sec) | 33 | 33 | 30 |
| String Gel (sec) | 53 | 55 | 52 |
| Vent Stability | 2.9 | 2.8 | 2.8 |
| Aged 3 days | | | |
| Extrusion | 36 | 37 | 33 |
| String Gel | 63 | 62 | 57 |
| Vent Stability | 2.8 | 2.8 | 2.8 |
| Aged 8 days | | | |
| Extrusion | 40 | 40 | 37 |
| String Gel | 65 | 66 | 61 |
| Vent Stability | 2.5 | 2.8 | 2.6 |
| Aged 11 days | | | |

TABLE 9-continued

| | Run | | |
|---|---|---|---|
| | 1 water, TEDA/NaX separately (a) | 2 water; TEDA/NaX together (b) | 3 water; TEDA separately (a) |
| Extrusion | 38 | 37 | 29 |
| String Gel | 57 | 56 | 52 |
| Vent Stability | 2.5 | 2.7 | 2.3 |

See Table 2 for Stability Rating

The data in Table 9 shows that the TEDA/NaX zeolite produced a delayed initiation compared to the DABCO 33-LV catalyst control initially and for 11 days. Note that, although a lower absolute amount of TEDA was used for the molecular sieve based catalysts, the string gel times were comparable to the control (Run 3) even after 11 days. One would expect that a lower TEDA content would extend the time to achieve string gel to unacceptably long durations. This is clearly not the case.

The masterbatch stability was equivalent to the control and the vent stability over 11 days was equal to or slightly better than the control. It can be seen that the order of addition is not critical to either the delayed initiation or the masterbatch stability/vent stability parameters of interest. This example shows the unexpected stability of the catalysts to direct contact with water in the masterbatch.

EXAMPLE 9

This example (Table 10) shows the effect of loading level of TEDA, sorbed into NaX zeolite. Masterbatch #3 was used.

TABLE 10

| | Run | | | |
|---|---|---|---|---|
| | 1 | 2 | 3 | 4 |
| TEDA Loading (wt % of zeolite) | 20.8 | 16.8 | 11.8 | 6.8 |
| TEDA Level (php) | 0.09 | 0.07 | 0.07 | 0.07 |
| 5 Vent Mold Reactivity | | | | |
| Extrusion (sec) | 35 | 37 | 47 | 52 |
| String Gel (sec) | 55 | 59 | 73 | 84 |
| Vent Stability | 2.8 | 2.8 | 2.8 | 2.8 |

See Table 2 for Vent Stability Rating

No aging studies were run. The data in Table 10 supported by inference from the previous examples shows the following:

1. TEDA is desorbed from the zeolite to produce a delayed initiation at the levels tested.
2. The lower the TEDA level the greater the delayed initiation. This is not surprising if one infers that all the TEDA is not desorbed from the zeolite during the foam formation. If less TEDA is available for desorption then the effect will be an extended delay in initiation and string gel.
3. All levels of TEDA in the zeolite produced excellent foam.

EXAMPLE 10

This example shows the direct applicability of the invention to actual manufacturing operations. The following masterbatch #5 was used in a high pressure foam machine to make polyurethane foam:

| Masterbatch #5 | |
|---|---|
| | pbw |
| Conventional triol (6000 mol wt) | 70 |
| Polyurea dispersed in polyol (N20%) | 30 |
| Silicone surfactant | 1.5 |
| Diethanolamine | 1.7 |
| Water | 4.2 |
| 70% BDMAEE in DPG | 0.12 |
| Catalyst | varied |
| Toluenediisocyanate (TDI) | 102 Index |

The stream temperature of both the A-side (TDI) and B-side streams were 73°±1° F. The shot time was 2.5 seconds at 40 pounds/minute throughput. The mold temperature at pour was 140°±2° F. and the foam pad was demolded in six minutes. The foam pads were evaluated for flow 24 hours after demolding.

TABLE 10

| | DABCO | | |
|---|---|---|---|
| | 33LV | 8154 | TEDA/NaX Zeolite |
| Catalyst Level (php) | 0.35 | 0.38 | 0.42 |
| TEDA Level (php) | 0.116 | 0.114 | 0.088 |
| Extrusion Time (sec) | 36–37 | 39–41 | 42–43 |
| String Gel (sec) | 47–48 | 50 | 50–52 |
| Vent Stability (3 Best) | 3.0 | 2.5 | 2.25 |
| Flowability (cm³) | 21 | 28 | 8–14 |
| Extrusion Time | 35–36 | 41 | 42–43 |
| String Gel | 45–46 | 53 | 51–52 |
| Vent Stability | 2.5 | 2–2.5 | 2.0–2.5 |
| Flowability | 27 | 21–30 | 18–19 |

Flowability Rating: ≦15 = excellent; 16–30 = very good; 31–45 = acceptable

The data in Table 10 shows that the fresh and aged (3 days) masterbatches containing TEDA/NaX zeolite extruded slower and had better flow than either control. String gel times of the masterbatches containing TEDA/NaX zeolite were equivalent to acid blocked TEDA.

EXAMPLE 11

This example shows the delayed initiation and extrusion response of TEDA sorbed into calcium Y zeolite and sodium mordenite and compares their performance with DABCO 33-LV catalyst (TEDA) run as a control. The following formulation was run in the evaluation.

| MASTERBATCH #6 | |
|---|---|
| | pbw |
| Pluracol 816ᵃ | 70 |
| Pluracol 1003ᵃ | 30 |
| DC-5043 | 1.5 |
| DEOA | 1.75 |
| water | 4.2 |
| DABCO BL-11 | 0.10 |
| Toluene diisocyanate 80/20 | 102 Index |

ᵃ5000 molecular weight triol ethylene oxide capped from BASF Corp.
ᵇ5000 molecular weight triol containing 22 wt % styrene-acrylonitirile copolymer from BASF Corp.

The TEDA (25.9 wt. %)/CaY zeolite and the TEDA (5.3 wt. %)/Na mordenite performances were compared to the DABCO 33-LV catalyst in the above masterbatch #6 by making free rise foam at ambient temperature and molded foam in a five vent mold at 140° F. Table 11 shows the cream, extrusion, and string gel times determined with fresh free rise foam and masterbatch containing the catalysts for 0, 5 and 7 days. The vent stability of the foams was also determined.

TABLE 11

|  | TEDA/CaY | DABCO 33-LV | TEDA/Na Mordenite |
|---|---|---|---|
| Use Level (php) | 0.42 | 0.35 | 2.19 |
| Actual TEDA Level (php) | 0.109 | 0.116 | 0.116 |
| FREE RISE FOAM FRESH | | | |
| Cream Time (sec) | 8 | 7 | — |
| Top of Cup (sec) | 43 | 38 | — |
| String Gel (sec) | 58 | 54 | — |
| Full Rise (sec) | 93 | 95 | — |
| 5 VENT MOLDINGS MB aged 0 days | | | |
| Cream Time | 11 | 11 | 13 |
| Extrusion Time | 43 | 38 | 57 |
| String Gel Time | 67 | 57 | 73 |
| Vent Stability | 2.3 | 2.5 | 2.0 |
| MB aged 5 days | | | |
| Cream Time | 11 | 10 | 8 |
| Extrusion Times | 36 | 33 | 35 |
| String Gel Times | 61 | 57 | 46 |
| Vent Stability | 2.7 | 2.7 | 1.5 |
| MB aged 7 days | | | |
| Cream Time | 11 | 10 | 10 |
| Extrusion Times | 39 | 37 | 58 |
| String Gel | 62 | 61 | 86 |
| Vent Stability | 2.8 | 2.7 | 1.0 |

The free rise data for TEDA/CaY zeolite shows a slight delay in cream time, a 5 second delay in time to the top of cup and also a 4 second delay in string gel. These results indicate a delayed reaction response by the TEDA/CaY catalyst. The molded foam results show an initial delayed response in the extrusion and string gel times of this catalyst compared to the DABCO 33-LV catalyst. The quality of the foam made from this catalyst is very good over the seven day period of this experiment. By comparing these results to previous examples it is clear that the TEDA/CaY zeolite catalyst provides the delayed response of an acid blocked amine without sacrificing the vent stability of the foam.

With regard to the TEDA/Na mordenite catalyst, the data indicates this catalyst would not be acceptable. It is believed that this poor performance is due to the low TEDA loading in the sodium mordenite host. It is expected that a higher loading of TEDA completely contained within the sodium mordenite would be successful. However, due to the one dimensional pore system and consequently poor diffusion properties of the zeolite, no further work to optimize this system was done.

The catalysts of the invention operate according to the laws of physical absorption. The amine catalyst is held within the microcavities of the microporous host and may desorb at elevated temperatures. Previously, latent catalysts and crosslinkers were only produced by chemical modification, i.e., some type of reversible adduct formation. The present invention eliminates the release of any undesirable components from the decomposition of the original adduct.

The following advantages are obtained: delayed initiation of the foaming or curing reaction is achieved with acceptable visual form and physical properties of the foamed product, the green strength of the foam is essentially constant over the pour life of the masterbatch, and no significant drift in reactivity is found over the normal useful life of a masterbatch, typically up to 72 hours.

Molecular sieve frameworks which have a substantial internal volume accessible to the desired catalyst or curing agent could be used in combination with any amine or other curing agent normally used to catalyze the polyurethane reaction. The catalyst of the invention can be prepared using any method which results in the sorption of one or more catalysts or curing agents into the void volume of the host molecular sieve.

STATEMENT OF INDUSTRIAL APPLICATION

The invention provides a catalyst composition for making polyurethane products in which the initiation time of the urethane reaction can be delayed and a masterbatch formulation containing the catalyst composition shows improved stability.

We claim:

1. In a method for the preparation of a polyurethane foam product, polyisocyanurate foam product, or mixtures thereof by reacting an organic polyisocyanate, a polyol and water as a blowing agent in the presence of an amine catalyst, the improvement which comprises employing, per 100 parts polyol, 0.2 to 2.5 parts by weight molecular sieve containing sorbed amine catalyst.

2. The method of claim 1 in which the molecular sieve contains 5 to 25 wt. % amine catalyst.

3. The method of claim 2 in which the amine catalyst is a blowing reaction catalyst.

4. The method of claim 2 in which the amine catalyst is a gelling reaction catalyst.

5. The method of claim 2 in which the amine catalyst is triethylenediamine, bis(dimethylaminoethyl) ether or bis(dimethylaminopropyl)methylamine.

6. The method of claim 1 in which the molecular sieve is a zeolite.

7. The method of claim 6 in which the zeolite is X or Y type zeolite.

8. The method of claim 1 in which the molecular sieve contains 15 to 25 wt. % amine catalyst.

9. The method of claim 2 in which the sorbed amine catalyst is triethylenediamine.

10. The method of claim 1 in which 0.5 to 1.5 parts by weight of the molecular sieve containing sorbed amine catalyst is employed per 100 parts polyol.

11. The method of claim 1 in which the molecular sieve containing sorbed amine catalyst is suspended in a liquid.

12. The method of claim 1 in which the polyol component comprises 20–80% polymer polyol.

13. In a method for the preparation of a polyurethane foam product, polyisocyanurate foam product, or mixtures thereof by reacting an organic polyisocyanate, a polyol and water as a blowing agent in the presence of an amine catalyst, the improvement which comprises employing, per 100 parts polyol, 0.2 to 2.5 parts by weight sodium X zeolite containing 5 to 20 wt. % sorbed triethylenediamine.

14. The method of claim 13 in which the zeolite contains 15 to 20 wt. % triethylenediamine.

15. The method of claim 13 in which the zeolite contains about 20 wt. % triethylenediamine.

16. The method of claim 13 in which 0.5 to 1.5 parts by weight sodium X zeolite containing sorbed triethylenediamine is used per 100 parts polyol.

17. The method of claim 13 in which the sodium X zeolite containing sorbed triethylenediamine is suspended in a liquid.

18. The method of claim 13 in which the polyol component comprises 20–80% polymer polyol.

19. In a method for the preparation of a polyurethane foam product, polyisocyanurate foam product, or mixtures thereof by reacting an organic polyisocyanate, a polyol and water as a blowing agent in the presence of an amine catalyst, the improvement which comprises employing, per 100 parts polyol, 0.2 to 2.5 parts by weight sodium Y zeolite containing 5 to 20 wt. % sorbed triethylenediamine.

20. The method of claim 19 in which the polyol component comprises 20–80% polymer polyol.

* * * * *